United States Patent
Wang

[11] Patent Number: 5,246,093
[45] Date of Patent: Sep. 21, 1993

[54] DRUM BRAKE ASSEMBLY

[75] Inventor: Nui Wang, Croydon, Australia

[73] Assignee: Brake & Clutch Industries Australia Pty. Ltd., Australia

[21] Appl. No.: 11,112

[22] Filed: Jan. 29, 1993

Related U.S. Application Data

[63] Continuation of Ser. No. 504,438, Apr. 5, 1990, abandoned.

[30] Foreign Application Priority Data

Apr. 12, 1989 [AU] Australia ............................. PJ-3649

[51] Int. Cl.$^5$ .......................................... F16D 65/06
[52] U.S. Cl. ................... 188/336; 188/250 A; 188/250 H; 188/216; 188/340; 188/106 F; 188/196 M; 188/196 V; 51/DIG. 3
[58] Field of Search .............. 188/336, 337, 338, 339, 188/340, 77 R, 77 W, 249, 216, 259, 250 A, 250 R, 250 D, 250 C, 250 H, 250 G, 106 F, 196 M, 196 V; 192/80, 75-78; 51/96, DIG. 3, 106 R, 105 R

[56] References Cited

U.S. PATENT DOCUMENTS

| | | | |
|---|---|---|---|
| 1,273,941 | 7/1918 | Smith | 188/337 X |
| 1,285,214 | 11/1918 | Kelley | 188/338 |
| 1,459,237 | 6/1923 | Muhleisen | 188/250 H |
| 1,773,584 | 6/1922 | Keys . | |
| 1,774,565 | 9/1930 | Price | 188/338 |
| 1,786,638 | 12/1930 | Wadell . | |
| 1,794,348 | 2/1931 | Chase | 188/250 C |
| 1,823,065 | 9/1931 | Scruby . | |
| 1,865,548 | 7/1932 | Whitworth | 188/250 C |
| 1,891,185 | 12/1932 | Miller et al. | 51/DIG. 3 |
| 1,898,136 | 2/1933 | Miller et al. . | |
| 1,906,201 | 4/1933 | Simpson | 51/DIG. 3 X |
| 1,919,545 | 7/1933 | Fisher | 51/DIG. 3 X |
| 1,926,064 | 9/1933 | Sawtelle . | |
| 1,949,070 | 2/1934 | Barrett . | |
| 1,950,260 | 3/1934 | Nelson et al. | 188/249 |
| 1,952,130 | 3/1934 | Harrison et al. . | |
| 1,957,635 | 5/1934 | Evans | 188/250 C |
| 1,960,352 | 5/1934 | Smith | 188/336 |
| 1,981,957 | 11/1934 | Kohr . | |
| 2,016,875 | 10/1935 | Sneed . | |
| 2,032,864 | 3/1936 | Begg et al. . | |
| 2,041,536 | 5/1936 | Fromaget | 188/336 |
| 2,057,824 | 10/1936 | Hard et al. . | |
| 2,096,219 | 10/1937 | White | 188/336 |

(List continued on next page.)

FOREIGN PATENT DOCUMENTS

| | | | |
|---|---|---|---|
| 1269454 | 5/1968 | Fed. Rep. of Germany . | |
| 1361516 | 4/1963 | France | 188/339 |
| 52-24668 | 2/1977 | Japan | 188/336 |
| 2-42219 | 2/1990 | Japan | 188/77 W |
| 1053617 | 1/1967 | United Kingdom . | |
| 1090058 | 11/1967 | United Kingdom . | |

OTHER PUBLICATIONS

Translation of Japanese Publication No. 52-24668, published Feb. 24, 1977.
Translation of FR 1361516 published 1964.
*Brakos* by John Remling, 1979, pp. 6-17 to 6-18.

*Primary Examiner*—Douglas C. Butler
*Attorney, Agent, or Firm*—Stevens, Davis, Miller & Mosher

[57] ABSTRACT

A drum brake assembly including a brake member comprised of a substantially circular shoe having a radially outer face on which at least one lining is mounted. The shoe is made from a high strength resilient material and is of substantially constant cross-section along its entire length. The brake member is arranged to be diametrically expanded by an actuation device on the brake assembly. When the actuation device is released the resilience of the shoe material causes the shoe to diametrically contract. The lining may be machined to a circular form prior to the brake member being fitted to the brake assembly, and that machining is preferably done after the shoe has been expanded a predetermined extent. The disclosure extends to a method of manufacturing a brake member and to a brake member for a drum brake assembly.

7 Claims, 5 Drawing Sheets

U.S. PATENT DOCUMENTS

| | | |
|---|---|---|
| 2,102,915 | 12/1937 | Rishel . |
| 2,166,754 | 7/1939 | Dick . |
| 2,167,935 | 8/1939 | Borden . |
| 2,174,243 | 9/1939 | Hawley . |
| 2,206,742 | 7/1940 | Dodge .................................. 188/336 |
| 2,215,547 | 9/1940 | Dick . |
| 2,236,345 | 3/1941 | Mossinghoff . |
| 2,273,223 | 2/1942 | Sawtelle .......................... 188/336 X |
| 2,293,710 | 8/1942 | Cadman . |
| 2,330,879 | 10/1943 | Forbes . |
| 2,596,379 | 5/1952 | Dodge ............................ 188/338 X |
| 2,768,714 | 10/1956 | Holdeman et al. ................. 188/259 |
| 3,386,535 | 6/1968 | Bishop et al. ..................... 192/77 X |
| 3,412,835 | 11/1968 | Goldberg ........................ 188/259 X |
| 3,999,633 | 12/1976 | Prouhet .......................... 188/259 X |
| 4,024,933 | 5/1977 | Hinderks ........................... 188/77 R |
| 4,452,346 | 6/1984 | Stukenborg ....................... 188/73.2 |
| 4,456,100 | 6/1984 | Manaki ........................... 188/259 X |

R = ROUND   R̃ = APPROX ROUND   NR = NOT ROUND

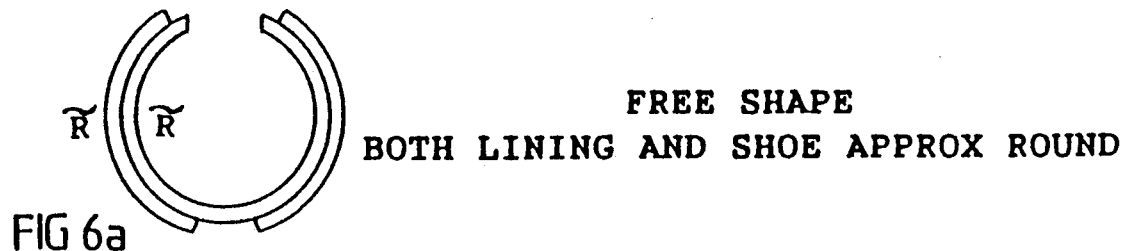

FREE SHAPE
BOTH LINING AND SHOE APPROX ROUND

FIG 6a

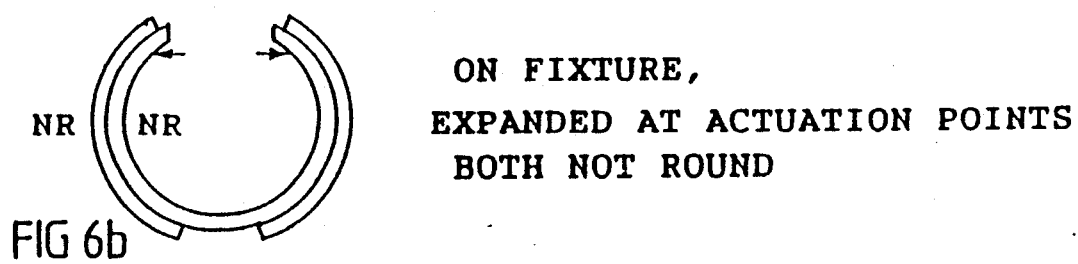

ON FIXTURE,
EXPANDED AT ACTUATION POINTS
BOTH NOT ROUND

FIG 6b

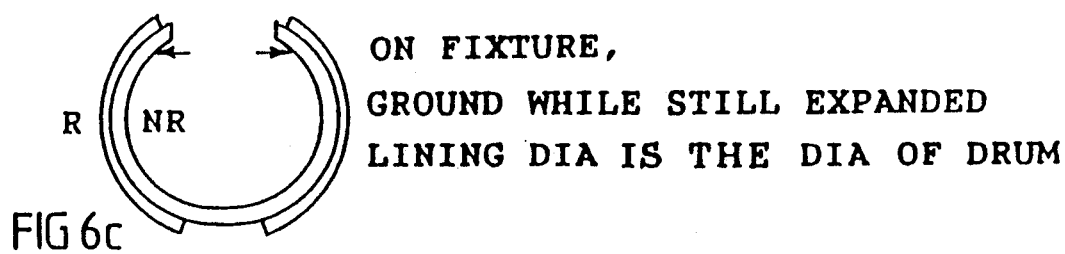

ON FIXTURE,
GROUND WHILE STILL EXPANDED
LINING DIA IS THE DIA OF DRUM

FIG 6c

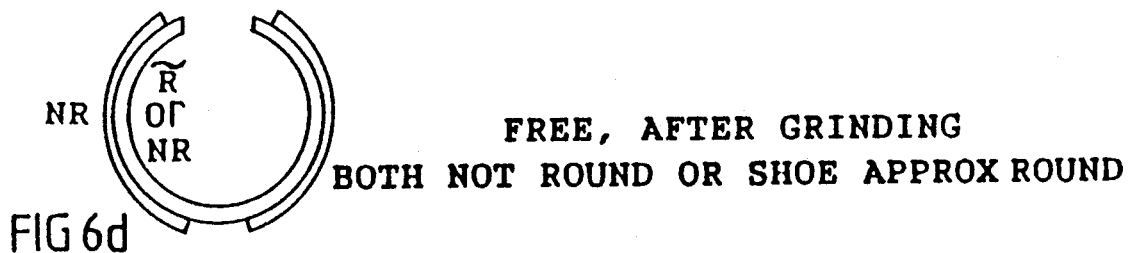

FREE, AFTER GRINDING
BOTH NOT ROUND OR SHOE APPROX ROUND

FIG 6d

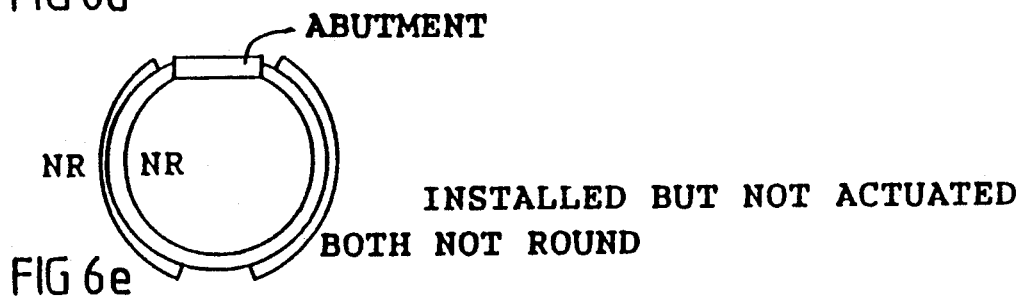

INSTALLED BUT NOT ACTUATED
BOTH NOT ROUND

FIG 6e

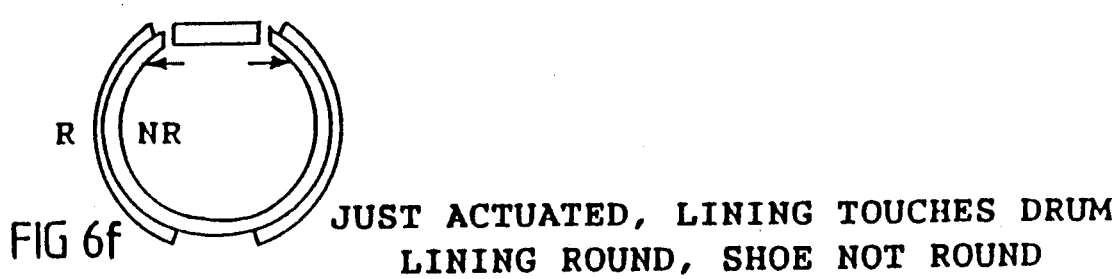

JUST ACTUATED, LINING TOUCHES DRUM
LINING ROUND, SHOE NOT ROUND

FIG 6f

DRUM BRAKE ASSEMBLY

This application is a continuation of application Ser. No. 07/504,438, filed Apr. 5, 1990, now abandoned.

This invention relates to drum brake assembly and more particularly to a drum brake assembly having a particular configuration brake shoe. The invention will be described with particular reference to a drum brake assembly for use in conjunction with a disc brake, but it is to be understood that the invention has a wider application.

Drum brakes are known to have certain advantages over disc brakes, particularly in park brake applications. Those advantages include superior braking force in some situations, and, where used as a park brake, the continued application of braking force where temperature variations occur while the brake is on. It has been found, for example, with certain disc type park brake assemblies, that where the temperature falls after the park brake has been applied, contraction of the brake components as a consequence of the temperature fall and a reduction of coefficient of friction with temperature fall will cause a relaxation of the braking force and possibly result in a vehicle run away.

A problem, however, with prior art drum brake assemblies is that they are of complex construction and assembly, and are generally comprised of a large number of components and parts. A typical prior art drum type park brake assembly uses a total of 31 separate parts per wheel, of which there are 18 different components. Such a large number of parts results in the park brake assembly being expensive and time consuming to assemble and fix to a vehicle.

A further problem with drum type park brake assemblies when used in conjunction with disc brake assemblies is that the park brake is generally only used after the vehicle has been brought to a stop by the disc brake. Thus, the drum shoe friction linings do not become properly bedded by wearing against the inner surface of the drum as in the case where the drum brake serves the function of both service and park brakes. Unless there is a near perfect match between the diameters of the lining when the brake is applied and the drum the shoe will not properly contact the drum over its entire surface and an inferior braking force will result.

An object of this invention is to provide a drum brake which is simpler than prior art brakes, but is no less effective than prior art brakes. A further object of the invention is to provide a single shoe drum brake which is capable of providing an effective braking force without requiring in-situ bedding. A yet further object of the invention is to provide a single shoe drum brake which can operate without return springs. A further object is to provide a method of manufacturing a brake member of a single shoe drum brake.

According to the invention there is provided a drum brake assembly comprising a drum rotatable on an axis and having a radially inner cylindrical surface, which forms at braking surface, a support, a brake member or shoe mounted on said support and being movable relative thereto, said brake shoe being of substantially circular form having a radially outer face and at least one friction lining mounted thereto on said outer face and extending around said circular form, and actuating means which, when actuated, causes said brake shoe to diametrically expand such that said lining of the shoe contacts said drum inner surface and thereby provides a braking action to said drum, said shoe being of substantially constant cross-sectional form along at least a major portion of its length, said cross-sectional form and the material from which the shoe body is made being such that said shoe provides significant support for said lining along the entire length of said lining, the resilience of said shoe body being such that when said actuating means is released, said shoe diametrically contracts to move said lining out of contact with said drum inner surface. The invention extends to a method of manufacturing a brake member for a brake assembly.

An embodiment of the invention is described in detail in the following passages of the specification which refer to the accompanying drawings. The drawings, however, are merely illustrative of how the invention might be put into effect, so that the specific form and arrangement of the various features as shown is not to be understood as limiting on the invention.

In the drawings:

FIGS. 6a, 6b, 6c, 6d, 6e and 6f show different stages in the grinding of a brake shoe according to the method of the invention.

Figure 1:
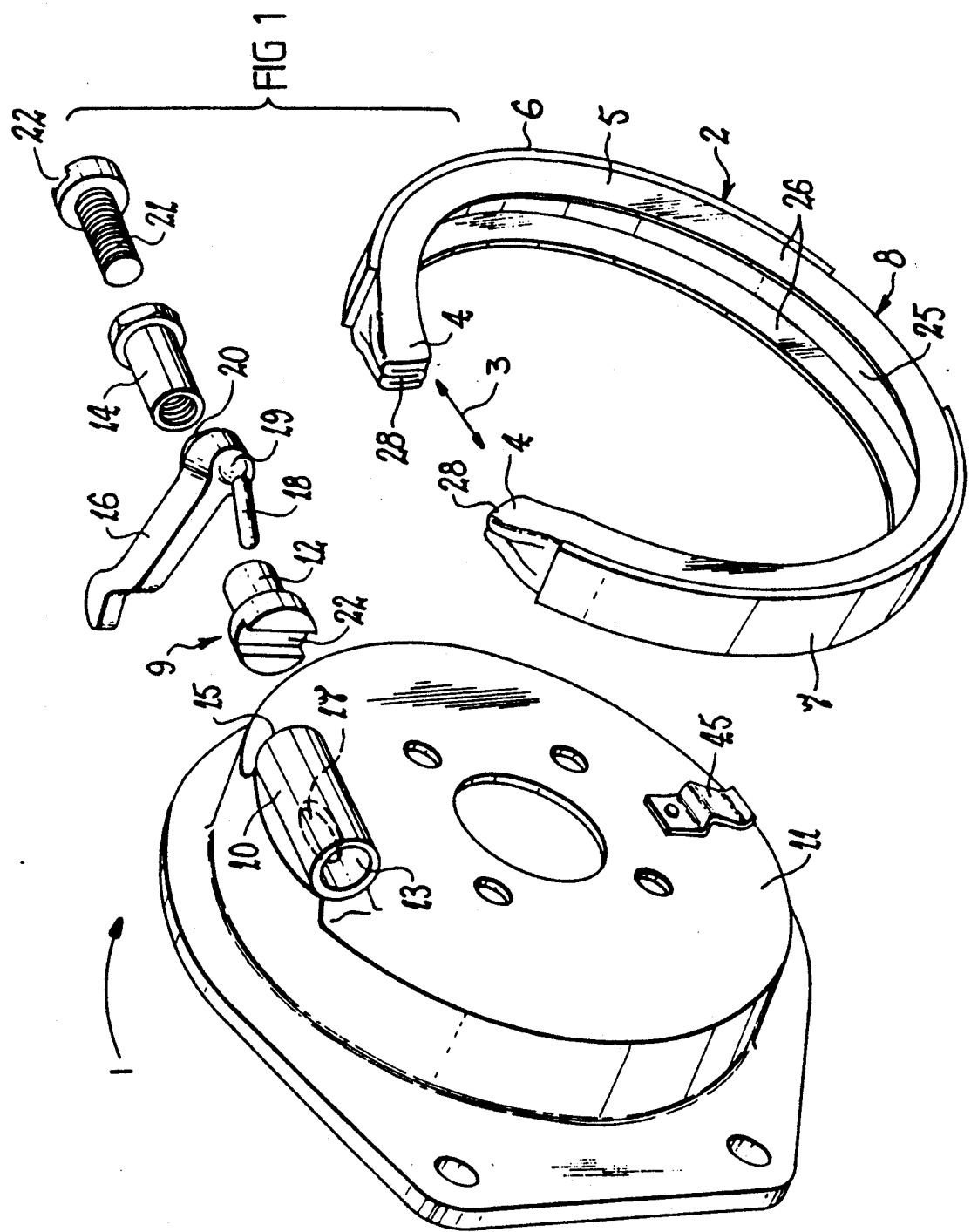
FIG. 1 shows an exploded perspective view of a drum brake assembly according to the invention.
Figure 2:
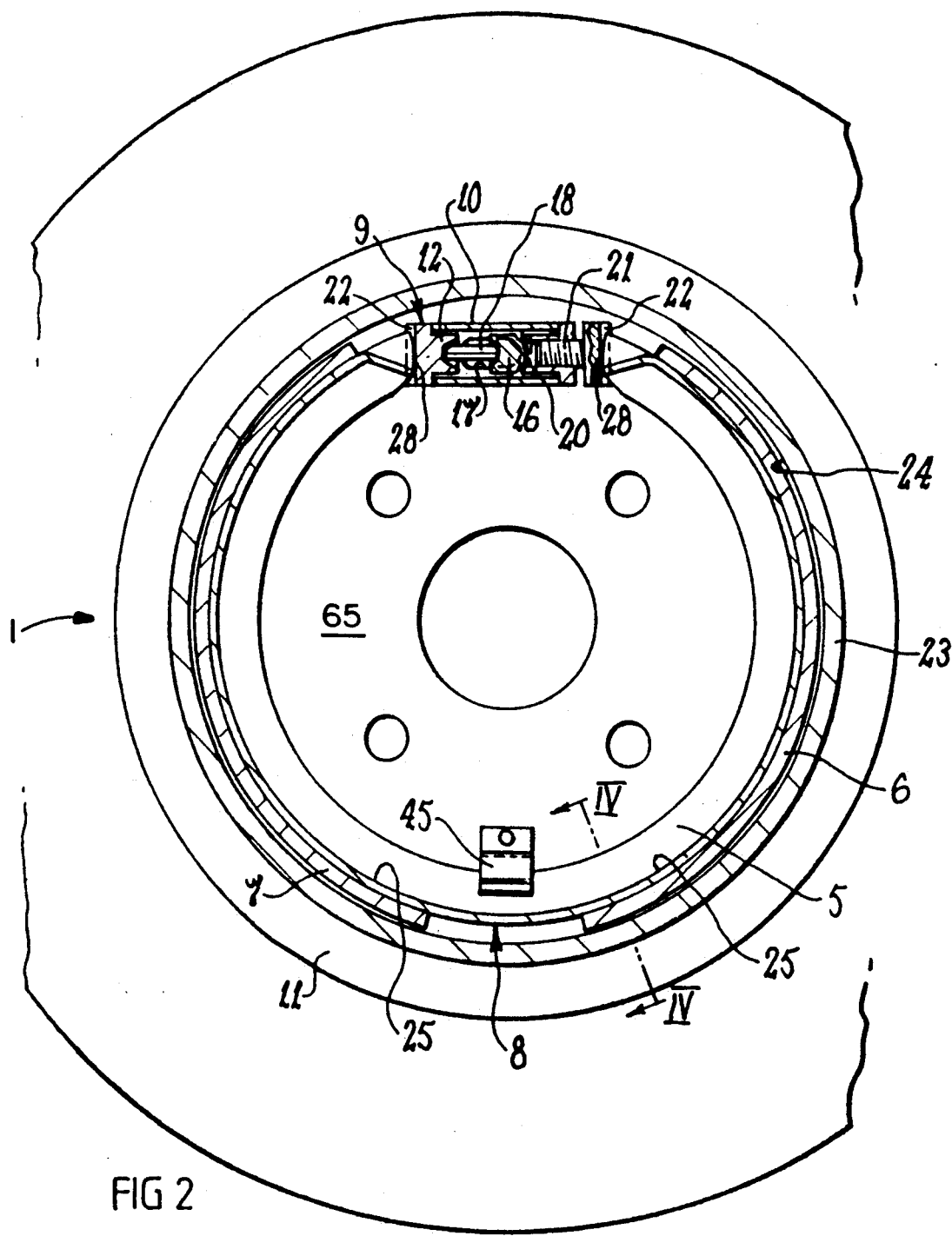
FIG. 2 shows a cross-sectional plan view of the assembly of FIG. 1.

A park brake assembly 1 as shown in FIGS. 1 and 2 of the drawings includes a brake member or shoe 2 which has been formed as a substantially closed circle, but with a gap 3 being defined between the ends 4 of the brake shoe.

The brake shoe 2 is comprised of a body 5 and a pair of friction linings 6 and 7 adhered or otherwise fixed in known manner to the radially outer face 8 of the body 5. The friction linings 6 and 7 will be made of conventional material as will be known by one skilled in the art, and the body 5 will be formed of a resilient material such as, but not limited to, mild steel, composite materials, high strength plastics, and sintered metals.

Any appropriate mechanism can be used to move the ends 4 of the body 5 apart. The mechanism may, for example, be mechanical or hydraulic. As shown in FIGS. 1 and 2 the mechanism 9 includes a tubular sleeve 10 which is fixed to a plate like support 11 which serves to provide structure for the brake assembly 1 and also serves as a dust cover for a disc brake assembly (not shown). The sleeve 10 thus serves as an abutment for the brake shoe 2. A tappet 12 locates in one end 13 of the sleeve 10, and an adjusting nut 14 locates in the other end 15 of the sleeve 10. An actuating lever 16 locates between the tappet 12 and the adjusting nut 12 and passes out of the sleeve 10 through an opening 17 in the back face thereof. A push rod 18 fits into a blind bore 19 in one end of the lever 16, and presses agains the tappet 12. A knuckle 20 on the opposite side of the lever locates in a recess in the adjusting nut 14. When the lever 16 is moved in use it operates cam-like to move the tappet 12 and nut 14 apart. An adjusting screw 21 screws into the adjusting nut 14 to provide a facility for varying the effective length of the mechanism 9. The tappet 12 and screw 21 each have a groove 22 therein in which the ends 4 of the brake shoe 2 locate. The lever 16 thus operates in use to urge the ends 4 of the brake shoe 2 apart into contact with the radially inner surface 24 of a drum 23 shown in FIG. 2.

The cross-section shape of the shoe body 5 can be of any suitable form although it is important that the shoe is able to properly support the linings 6,7 around the entire circumference of the brake shoe 2. This differs from prior art band brake type arrangements in which the circumferential band is very flexible in a radial direction and does not adequately support the lining. The radial forces on the lining during braking can be very high and if the shoe distorts inwardly to even a small extent a significant area of the lining will no longer provide an adequate braking force.

However, it is also important that the body 5 has some resilience. This differs from some prior art arrangements, such as two shoe drum brakes, where the shoe or shoes are more rigid. These prior art shoes require either a plurality of actuators to operate or are pivotable relative to their abutments, require spring retractors, and are accordingly complicated and expensive. It is this complicated requiring of a large number of components to operate complicated multi-component type arrangement upon which the present invention seeks to improve.

Figure 4:
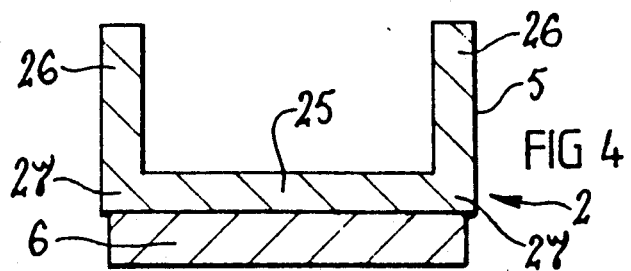
FIG. 4 shows a cross-sectional view along line IV—IV of FIG. 2.

The shoe body 5 depicted in FIG. 1, 2 and 4 is of channel cross-sectional shape comprising a web 25, and a pair of parallel flanges 26 which connect to and are preferably integral with the lateral edges 27 of the web 25 and project radially inwardly. The flanges 26 serve to increase the bending strength of the shoe and thereby resist radially inward deflection of the shoe under braking load. The dimensions of the flanges and web will be selected according to the particular application and anticipated loads. In one example application, which is considered suitable for a motor car park brake, the shoe body 5 was made of mild steel, the flanges 26 had a length of 12.5 mm and a thickness of 2.5 mm, and the web was 25 mm wide and had a thickness of 2.5 mm. A mild steel shoe body will have sufficient resilience to retract the linings 6,7 out of contact with the inner surface of the drum after the brake has been applied. Clearly, other body configurations are possible, and specifically envisaged is a T-shaped body having the leg of the T-shape projecting radially inwardly to increase the bending strength of the body.

It is important that the shoe body has some resilience, for the configuration of the shoe body is such that it acts as a spring in reducing the diameter of the shoe after the actuating mechanism 9 has been released. The spring force required can be derived from the sectional dimensions of the body 5. Thus, no additional springs are necessary in order to retract the brake. It is not, however, essential that the body be made from high strength spring type material. It is, however, important that even if the body 5 is stressed so that the body material reaches its yield point, or beyond, the material will still have sufficient resilience to cause the shoe to retract out of engagement with the drum against which its lining bears under braking conditions. Thus it is envisaged that the body may be made from a mild steel material which is relatively inexpensive but which will provide sufficient resilience for the brake to operate and retract. In some applications it may be advantageous to also include retracting springs.

To assure that the brake shoe 2 operates effectively, and all components are tightly held in position after assembly, it is envisaged that the diameter of the shoe body 5 as manufactured will be of smaller than the diameter of the shoe when assembled in the brake-off position. Thus, to assemble the brake it will be necessary to radially expand the body 5 to move the ends 4 apart against the action of the resilience of that body so that, when assembled, the spring force in the shoe body material will hold the brake components in an assembled and brake-off condition.

It is desirable that the shoe body 5 has a substantially constant cross-sectional shape along its entire length. This is desirable because the manufacture of the shoe body can then be effected by simply cutting individual body sections from a length of constant cross-section material of suitable dimensions, and then bending those cut lengths into their circular form. Clearly it will not then be necessary to fabricate the shoe body from various parts as has heretofore been the norm. Where the radius of the shoe body is small it may be necessary to treat the flange or flanges during the bending process to ensure that there is no crimping or bending of the flanges, but this would be a non-complicated manufacturing technique which could be rapidly carried out on a mass production line.

The ends 4 of the shoe body are preferably crimped into an M-shape as depicted at numeral 28 in FIG. 1 to provide a suitable end formation which will fit into the grooves 22 in the actuating mechanism 9. The crimping of the ends 4 as shown will provide an effective yet simple method of forming the ends so that force transmitted by the actuating mechanism 9 will be transmitted to the shoe body substantially along the longitudinal axis of that body. It will, however, be appreciated that it will be possible to provide contact points on the shoe body which the actuating mechanism will engage which are spaced away from the ends 4.

It will be possible for there to be an alternative position for the reaction or abutment point. In the embodiment shown in FIG. 3 of the drawings an abutment arm 30 is located midway between the ends 31 of the shoe body 32 and can be compared with a conventional "leading-trailing" shoe arrangement. The flanges 33 of the shoe body 32 may, for this purpose, each have a rectangular seat 34 cut out of them and the abutment arm may fit neatly into the seats so formed in order to provide an abutment point. End faces 35 and each end of the seat 34 contact the abutment arm 30. In this arrangement the shoe will be substantially free, pivoting relative to the abutment arm 30, as well as possessing the necessary resilience to retract the shoe from its brake-on condition. The actuating mechanism in this application is a hydraulic piston and cylinder assembly 36 and the ends 31 have been rounded to provide contact points which are end faces 37 of the piston and cylinder assembly 36 engage. An adjuster mechanism (not shown) will also generally be included in the actuating mechanism.

Figure 3:
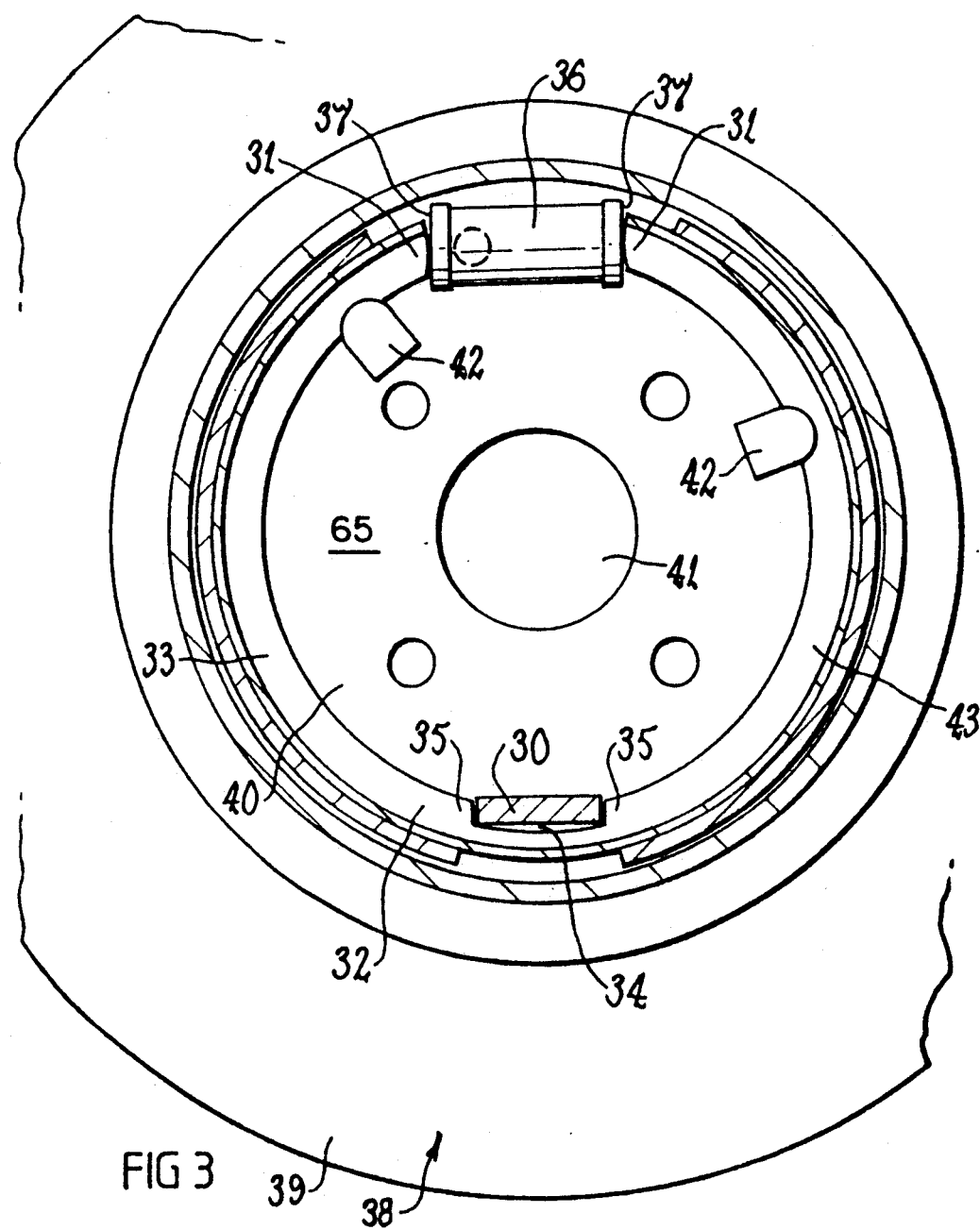
FIG. 3 shows a cross-sectional plan view of an alternative assembly according to the invention.

The single piece brake shoe according to the invention can be used as both a service and a park brake. FIG. 3 shows this configuration. It may be advantageous to secure the shoe body 32 to the backing plate 65 or dust shield which protects the inboard side of the disc (not shown). Where a dust shield 38 is provided that shield may have an annular disc portion 39 which is coaxial and face to face with the inboard side of the disc, and a central hub portion 40 having a central opening 41 through which the wheel axle (not shown) passes. The shoe body 32 may be mounted to the central hub portion 40 in any convenient way. In the preferred method of mounting the hub portion 40 has a plurality of spring clips 42 (FIG. 3) or 45 in FIG. 2 integrally formed therewith, and those clips 42 engage the inboard flange 43 of the shoe body 32 to hold that body in position. The manner of engagement is such that the shoe is able to move relative to the hub parallel to the face of the hub under normal braking conditions, the outer face of the inboard flange 43 sliding on the face of the hub 41.

Optionally a wear shim (not shown) may be interposed between the flange and shoe body to facilitate that movement. The spring clips 42 may be formed in any convenient way although it is envisaged they will each take the form of a tab punched out of the hub plate material and remaining joined to the hub along a radially inner edge 44 of the tab. The natural resilience of the hub plate material will provide the spring force for the clips 42. Alternatively, and as shown in FIG. 1, a conventional separate hold down spring 45 can be used.

Clearly a simple one piece shoe has other advantages besides just a reduction in the number of components. One of those advantages is that the entire radially outer surface of the lining or linings may be easily machined or ground to ensure the surface is of a true and correct circular configuration. A single machining operation is all that will be required as opposed to the separate operations required for brake assemblies having two shoes. The linings of band brakes are not able to be properly machined since they are too flexible and their circumference is defined by the manner in which they are mounted in the brake assembly.

Figure 5:
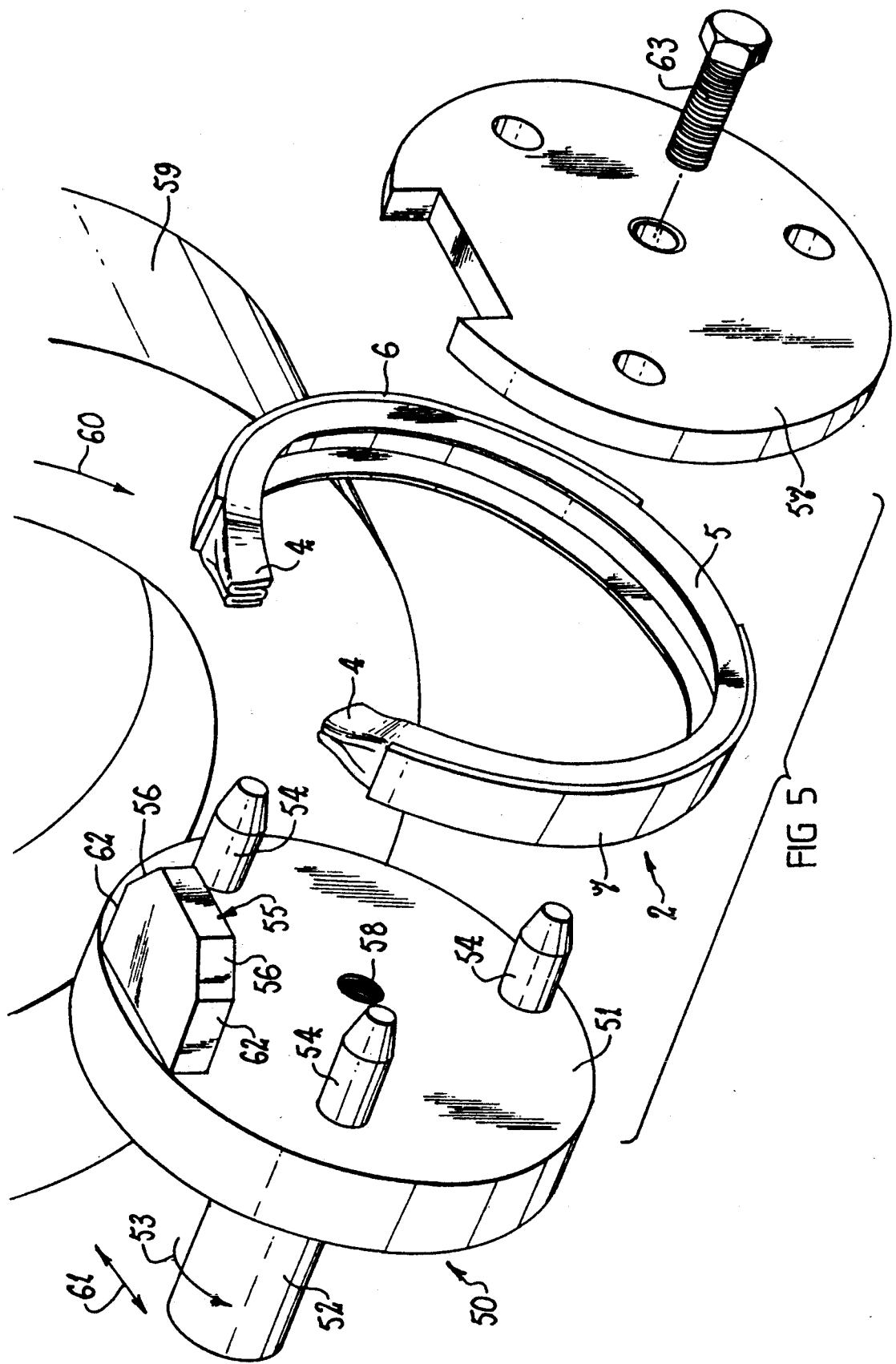
FIG. 5 shows a perspective view of apparatus for grinding a drum brake shoe.

Turning now to FIGS. 5 and 6 of the drawings, the method of forming a brake shoe according to the invention will be described in detail with reference to those drawings. As shown, apparatus is used comprising a jig 50 which is in the form of a wheel 51 rotatable on a shaft 52 in the direction of arrow 53. The wheel carries three locating or centralizing pins 54 which serve to hold the brake shoe 2 on the wheel 51. A shoe expanding block 55 is fixed to the wheel and that block 55 has two tapered surfaces 56 which serve to expand the brake shoe when it is positioned on the wheel. Thus, the width of the block 55, between contact faces 62, serves to define the extent to which the ends 4 of the brake shoe 2 are forced apart. A clamping plate 57 is provided for clamping the brake shoe 2 to the wheel and a bolt 63, which screws into an axial threaded bore 58 in the wheel holds the plate 57 to the wheel. An annular grinding wheel 59 is rotatable in the direction of arrow 60, and the axis of rotation of the grinding wheel is 90° to the axis of rotation of the jig 50. The jig 50 is movable into or out of contact with the grinding wheel in the direction of arrow 61.

The width of the block 55 is selected such that when the brake shoe 2 is positioned on the jig 50 the brake shoe is expanded such that the outer surface of the un-machined linings 6, 7 are at a diameter slightly larger than the internal diameter of the drum with which the brake shoe is to be used, and the shoe is in its "just touching the drum" position.

It is considered important, that the contact faces 62 contact the ends 4 of the brake shoe 2 at or near the point where the actuating mechanism of the brake assembly 1 will in use contact the brake shoe 2. This is so that the brake shoe 2 adopts its in use form during the grinding process. In some situations it may be possible to use the pins 54 to effect the expansion of the shoe and to omit the block 55.

Turning specifically to FIGS. 6 of the drawings, the steps in the grinding process are depicted diagrammatically. The meaning of the symbols shown on the drawings are as follows:
NR means "not round"
R means "round"
R means "approximately round"

As shown in these drawings the shoe body 5 and linings 6 and 7 are not drawn to scale to simplify the description.

In FIG. 6a the body 5 and linings are both approximately round. This is the condition the brake shoe is in prior to grinding. FIG. 6b depicts the brake shoe 2 after it has been fixed to the jig, but prior to grinding. Both linings 6,7 and body 5 are not round in this condition, but the shoe is expanded to its in use position in which the linings would just be touching the inner surface of the drum if they were ground.

FIG. 6c depicts the brake shoe 2 after grinding has been completed while the brake shoe is still held on the jig. The outer surfaces of the linings 6 and 7 are now round, whilst the body 5 is not round. The ground diameter of the outer surface of the linings 6 and 7, with the shoe mounted to the jig, is ideally the same as the diameter of the drum inner surface with which the brake shoe is to be used. If the diameter of the linings in this expanded condition is greater than the drum surface the resultant brake action in use will be a "heel and toe" contact If the lining is ground to the same diameter as the drum surface there will be full contact between the lining and the drum as the brake is applied. If the lining is ground to a diameter which is less than the diameter of the drum surface there will be a crown contact between the linings and the drum when the brake is applied. Thus the ground diameter will be chosen to be the same as the drum inner surface diameter, in order to achieve maximum surface contact between the lining and the drum.

FIG. 6d depicts the brake shoe after it has been removed from the jig but before installation in the brake assembly. In this condition the shoe body 5 is approximately round (or not round if it has been stressed beyond the yeild point of the body material) and the linings outer surfaces are not round.

FIG. 6e depicts the brake shoe in its installed condition in which the ends 4 of the brake shoe are held apart to an extent by an abutment 65. In this condition both body and linings are not round.

In FIG. 6f the brake shoe 2 has been expanded into touching contact with the drum inner surface and the radially outer faces of the linings 6,7 are now round, while the shoe body 5 is not round. Thus, there is optimum contact between the radially outer faces of the linings 6,7 and the drum immediately the linings contact the drum surface. No bedding of the linings to the drum is required and full braking force will thus be applied as soon as the brake is fully applied. The linings of the brake shoes shown in FIGS. 1 to 4 of the drawings will have been ground in like manner prior to being installed in the brake assemblies depicted in those drawings.

The single shoe arrangement described above can be employed in both service brake and park brake applications. Also, it will be possible to incorporate an automatic brake adjustment mechanism should this be deemed desirable for any particular application. The term "single shoe" as used in this specification means a shoe which operates as a single unit. Clearly the shoe may itself be formed from two or more shoe components, joined together permanently or temporarily, which act substantially as a single unit.

It is to be understood that various alterations, modifications and/or additions may be introduced into the constructions and arrangements of parts previously described without departing from the spirit or ambit of the invention as defined by the appended claims.

I claim:

1. A drum brake assembly comprising a drum rotatable about an axis and having an inner cylindrical surface which forms a braking surface, a support, a brake shoe of generally circular loop form, means mounting said shoe on said support and permitting said shoe to move relative to said support to adopt either an inoperative configuration at which an outer surface of said shoe does not engage said braking surface or an operative configuration at which said outer surface engages said braking surface, said mounting means including abutment means attached to said support and which is operative to hold said shoe against rotation with said drum, said brake shoe including a single piece body having two separate and opposed ends and at least one section of friction lining attached to said body and forming said outer surface, said mounting means permitting both said ends, to move in a corresponding manner relative to said drum during movement of said shoe between said two configurations thereof, and actuating means positioned between said body ends and being operable to enlarge the separation between said shoe ends and thereby cause radial expansion of said shoe such that it adopts said operative configuration, wherein said shoe body undergoes resilient distortion in response to said radial expansion and is sufficiently rigid to resist radial inward distortion when the brake assembly is operative, said shoe body functions as a return spring when said shoe is in the operative configuration to return said shoe to said inoperative configuration when said actuating means ceases to be operable to enlarge said separation between said body ends, said outer surface has a non-uniform radius of curvature along the circumference thereof when the shoe is in the inoperative configuration and has a uniform radius of curvature when the shoe is in the operative configuration, and said uniform radius of curvature is predetermined so as to be equal to the radius of curvature of said braking surface and results from subjecting said lining to a material removal process after being attached to said body and while said body is held in a radially expanded and resiliently distorted condition, said material removal process being carried out prior to installation of said shoe in said assembly so that said predetermined uniform radius of curvature exists at the time of initial contact between said outer surface and said braking surface.

2. A drum brake assembly according to claim 1, wherein said shoe body is of substantially uniform cross sectional size and shape through at least a major part of its circumferential length.

3. A drum brake assembly according to claim 2, wherein said substantially uniform cross-sectional size and shape comprises an elongate web to which said lining is attached and at least one co-extending flange projecting radially inwardly from said web.

4. A drum brake assembly according to claim 3, wherein said shoe body is of channel shaped cross-sectional form and has a second said flange arranged parallel to the first said flange, and each of said flange extends radially inwardly from a respective one of two opposite lateral edges of said web.

5. A drum brake assembly according to claim 4, wherein said channel is crimped at each said end of the body so that said flanges are arranged close together at each said end.

6. A vehicle brake assembly including, a drum rotatable about an axis and having an inner cylindrical surface which forms a braking surface, a support, a brake shoe of generally circular loop form, means mounting said shoe on said support so that the shoe is substantially free to move relative to said support, and actuating means operable to transform said shoe from an inoperative configuration at which an outer surface thereof does not engage said braking surface to an operative configuration at which said outer surface engages said braking surface, wherein said shoe includes a body and at least one section of friction lining attached to said body, said lining forms said outer surface, said body is sufficiently rigid to resist radially inward deflection when the brake assembly is operative and is of substantially uniform cross-sectional size and shape through at least a major part of its circumferential length, said actuating means is located between two separate and opposed ends of said body and is operable to enlarge the separation between those ends and thereby cause radial expansion of said shoe such that said shoe is transformed from said inoperative configuration to move said operative configuration, said shoe body undergoes resilient distortion as a consequence of said radial expansion such that when said shoe is in said operative configuration said body functions as a spring to return the shoe to said inoperative configuration when said actuating means ceases to be operable to enlarge said separation, said outer surface has a non-uniform radius of curvature along the circumference thereof when the shoe is in the inoperative configuration and has a uniform radius of curvature when the shoe is in the operative configuration, and said uniform radius of curvature is predetermined so as to be equal to the radius of curvature of said braking surface and results from subjecting said lining to a material removal process after being attached to said body and while said body is held in a radially expanded and resiliently distorted condition, said material removal process being carried out prior to installation of said shoe in said assembly so that predetermined uniform radius of curvature exists at the time of initial contact between said outer surface and said braking surface.

7. A brake assembly including, a drum rotatable about an axis and having an inner cylindrical surface which forms a braking surface, a support, a brake shoe of generally circular loop form mounted on said support, means holding said shoe against rotation with said drum, and an actuator operable to transform said shoe from an inoperative configuration at which an outer surface thereof does not engage said braking surface to an operative configuration at which said outer surface engages said braking surface, wherein said shoe is mounted on said support with minimum constraint so that it is free to self-align relative to the drum braking surface as the shoe adopts said operative configuration, said shoe includes a body and at least one section of friction lining attached to said body, said lining forms said outer surface, said body is sufficiently rigid to resist radially inward deflection when the brake assembly is operative and is of substantially uniform cross-sectional size and shape through at least a major part of its circumferential length, said actuating means is located between two separate and opposed ends of said body and is operable to enlarge the separation between those ends and thereby cause radial expansion of said shoe such that said shoe is transformed from said inoperative configuration to said operative configuration, said shoe body undergoes resilient distortion as a consequence of said radial expansion such that when said shoe is in said operative configuration said body functions as a spring to return the shoe to said inoperative configuration when said actuating means ceases to be operable to enlarge said separation, said outer surface has a non-uniform radius of curvature along the circumference thereof when the shoe is in the inoperative configuration and has a uniform radius of curvature when the shoe is in the operative configuration, and said uniform radius of curvature is predetermined so as to be equal to the radius of curvature of said braking surface and results from subjecting said lining to a material removal process after being attached to said body and while said body is held in a radially expanded and resiliently distorted condition, said material removal process being carried out prior to installation of said shoe in said assembly so that said predetermined uniform radius of curvature exists at the time of initial contact between said outer surface and said braking surface.

\* \* \* \* \*